United States Patent [19]

Sturhahn

[11] 3,887,387

[45] June 3, 1975

[54] SHAPED ZIRCONIUM OXIDE BODIES OF HIGH STRENGTH

[75] Inventor: Hans Sturhahn, Esslingen-Liebesbronn, Germany

[73] Assignee: Feldmuhle Anlagen- und Produktions- Gesellschaft mit beschrankter Haftung, Oberkassel, Germany

[22] Filed: Feb. 11, 1974

[21] Appl. No.: 441,646

[30] Foreign Application Priority Data
Feb 16, 1973  Germany...................... 2307666

[52] U.S. Cl.................................. 106/57; 106/732
[51] Int. Cl............................................ C04b 35/48
[58] Field of Search.................... 106/57, 39.5, 73.2

[56] References Cited
UNITED STATES PATENTS

| | | | |
|---|---|---|---|
| 3,350,230 | 10/1967 | Tannenberger et al............... | 106/57 |
| 3,607,323 | 9/1971 | Tedmon et al........................ | 106/57 |
| 3,634,113 | 1/1972 | Fehrenbacher....................... | 106/57 |

*Primary Examiner*—J. Poer
*Attorney, Agent, or Firm*—Hans Berman

[57] ABSTRACT

Shaped bodies of zirconium oxide of high mechanical strength can be prepared by sintering a pulverulent mixture of 30% to 90% monoclinic zirconium oxide, 7.8% to 69.5% zirconium oxide conventionally stabilized by bound oxides of metals having an ionic radius similar to that of zirconium, and 0.5% to 2.2% magnesium oxide and/or calcium oxide at above 1,600°C, the combined amount of the stabilizing oxide and of the magnesium and/or calcium oxide in the sintered body being 2.5% to 3.5%.

13 Claims, No Drawings

SHAPED ZIRCONIUM OXIDE BODIES OF HIGH STRENGTH

This invention relates to shaped bodies of polycrystalline, sintered zirconium oxide, and to a method of preparing such bodies.

Zirconium oxide powder can be shaped under pressure into green compacts, and the compacts can be sintered at temperatures about 1,600°C to form polycrystalline bodies. Zirconium oxide has a melting point at approximately 2,700°C, it is chemically stable in oxidizing atmosphere to 2,400°C and in reducing atmospheres to 2,200°C, and it is thus a potentially valuable structural material under conditions in which these properties are required.

Zirconium oxide is monoclinic at ordinary temperatures and is converted to a different crystal form when heated to the sintering temperature. Its specific gravity changes abruptly at the transformation temperature so that green compacts prepared from monoclinic zirconium oxide crack or even disintegrate when it is attempted to heat them to the sintering temperature.

It is known that cubic zirconium oxide can be stabilized at much lower temperatures than the aforementioned transformation temperature by heating the oxide to a high temperature in the presence of oxides of metals having an ionic radius similar to that of zirconium, such as calcium, magnesium, yttrium, lanthanum, cerium, ytterbium, and other rare earth metals, as well as cadmium, manganese, cobalt, and titanium, which diffuse into the zirconium oxide and are bound thereto. Sintered bodies prepared from stabilized zirconium oxide are coherent and strong enough to permit their use in laboratory equipment, in grinding balls, extruder mandrels, yarn guides, and like applications.

Sintered bodies of stabilized zirconium oxide, however, do not approach the mechanical strength of sintered, high-purity aluminum oxide and thus have not been accepted in fields in which the thermal and chemical inertness, and the mechanical strength of aluminum oxide are required, but a material less brittle than aluminum oxide would be desirable.

The primary object of this invention is the provision of shaped bodies of sintered, polycrystalline zirconium oxide much stronger than those available heretofore. A concomitant object is the provision of a method for making the stronger zirconium oxide bodies.

It has been found that shaped bodies combining the desirable thermal and chemical properties of zirconium oxide with superior mechanical strength can be obtained by sintering compacts prepared from intimately mixed pulverulent monoclinic zirconium oxide, pulverulent zirconium oxide stabilized as described above, and pulverulent magnesium oxide or calcium oxide. The monoclinic zirconium oxide should amount to 30% to 90% of the compacted mixture, the stabilized zirconium oxide to 7.8% to 69.5%, and the magnesium or calcium oxide to 0.5% to 2.2%, the amount of stabilizing oxide in the stabilized zirconium oxide being chosen to make the amount of all oxides other than zirconium oxide in the sintered body 2.5% to 3.5%. When the other oxides are magnesium oxide and/or calcium oxide, the combined weight of magnesium oxide and calcium oxide should be 2.7% to 3.3%.

The sintering time and sintering temperature are selected in such a manner that 75% to 95% of the crystals in the sintered body are cubic. It is then found that the density of the sintered body is at least 5.5 g/cm³, but may closely approach that of zirconia monocrystals, and the flexural strength of test rods prepared from the sintered material is at least 30 kp/mm².

When magnesium oxide and zirconium oxide are the only oxides present in amounts greater than incidental trace amounts or as impurities, a flexural strength of 45 kp/mm² is readily exceeded when the amount of magnesium oxide is between 2.5% and 3.0%, a strength greater than 55 kp/mm² is achieved within the range of 2.6% and 2.85% magnesium oxide, and optimum values of flexural strength are reached at magnesium oxide contents near 2.7%. Densities greater than 5.6 g/cm³ and even beyond 5.7 g/cm³ are found under preferred conditions.

When the oxide in the sintered body are magnesium oxide and calcium oxide in a weight ratio between 1:2 and 2:1, the shear strength of the material exceeds 55 kp/mm², the average grain size is greater than 35 m$\mu$, and the density is greater than 5.55 g/cm³.

The zirconium oxide products of this invention have some mechanical properties closely similar to corresponding properties of pure, sintered aluminum oxide, and other mechanical properties which are superior to those of sintered, polycrystalline aluminum oxide, as will presently become apparent.

The following Examples are illustrative of this invention.

EXAMPLE 1

A pulverulent mixture was prepared from 4,200 g (68.7%) monoclinic zirconium oxide, 1,800 g (29.4%) stabilized zirconium oxide, and 117 g (1.9%) magnesium oxide. The ingredients were ground in the presence of a small amount of water until the specific surface area of the powder reached 4.5 m²/g.

The zirconium oxide powder, which was the major component of the mixture, was prepared by crushing molten zirconium oxide having a purity of more than 99% $ZnO_2$. The pre-stabilized fraction contained 3.8% magnesium oxide, based on zirconium oxide, which had been incorporated in the material by diffusion in a manner known in itself. The specific surface area was determined by the method of Brunauer et al (J.A.C.S.60 [1938] 309-319).

Approximately 1% polyvinyl alcohol in the form of a 10% aqueous solution was added to the finely ground mixture to facilitate the shaping of green compacts in a conventional laboratory press. The compacts were gradually heated in a tunnel oven in air to 1,770°C over a period of 10 hours, held at temperature for 2 hours, and cooled to ambient temperature in ten hours.

The thirty sintered, rectangular test pieces so prepared had dimensions of 4 × 4 × 32 mm. They had a specific gravity of 5.75, a hardness of 1,200 kp/mm² (Knoop indenter, 300 g), and an average flexural breaking strength of 63 kp/mm² in the "as sintered" condition. The strength of test pieces prepared in the same manner, but polished after sintering, was about 10% higher.

EXAMPLE 2

A finely granular mixture was prepared as described in Example 1 from 65.6% monoclinic zirconium powder, 32.8% stabilized zirconium oxide, and 1.6% magnesium oxide. The mixture was ground until its specific surface reached a value of approximately 5 m²/g.

The stabilized zirconia had been prepared by diffusion in a known manner and contained 4.4% calcium oxide, based on the zirconium oxide.

Test specimens were pressed and sintered as in Example 1. They had a density of 5.75 g/cm³, an average grain size of 50 m$\mu$, a hardness of 1,500 kp/mm², a flexural breaking strength of 30 kp/mm², and an average shear strength of 59 kp/mm². The shear strength was determined according to the German Industrial Standard DIN 50141 (W. Dawihl et al, Ber. Deutsche Keram. Ges. 43 [1966] No. 4, page 281).

The tests for flexural strength were performed by a three-point loading method closely analogous to A.S.T.M. Method D-790 using a central loading nose and two stationary supports rounded to a radius of curvature of 2.5 mm, the effective spacing of the supports being 25 mm. The method has been described by R. M. Springs et al (J. Am. Cer. Soc. 1963, page 224).

A wire drawing capstan of the type described in U.S. Pat. No. 3,432,146 was assembled with sintered zirconium oxide rings of the invention prepared as described in Example 2. When subjected to the Amsler test, they showed a groove depth of 6 – 15 m$\mu$ after 24 hours, indicating that each ring could be used successfully for drawing 400 tons of copper wire from 5 mm to 1 mm diameter. By way of comparison, the best sintered aluminum oxide rings show grooves of 38 m$\mu$ in the Amsler test under the same conditions.

The superiority of the zirconium oxide rings to rings of aluminum oxide is believed due to the observed fact that surface irregularities caused by wear tend to grow much more rapidly in the aluminum oxide rings than in zirconium oxide rings of the invention. Investigation has shown that extremely small crystals of good, sintered, aluminum oxide are dislodged in their entirety by wear, leaving sharp edges of adjacent crystals exposed. The stress concentration on these edges is such as to lead to sequential removal of the adjacent crystals.

The crystal structure of sintered zirconium oxide according to the invention is much coarser than that of the aluminum oxide, and the contact areas of adjacent crystals much greater so as to anchor each crystal firmly to its neighbors. Wear causes removal of exposed material from each crystal in the ring surface without loosening the bond between the remainder of the crystal and adjacent crystals. A crystal is torn from the zirconium oxide surface only after it has been worn down to a minimal thickness and leaves a very shallow recess not conducive to rapid dislodging of adjacent crystals. Aluminum oxide rings do not normally fail until after prolonged service. When failure starts, however, it progresses rather rapidly. Zirconium oxide rings prepared according to this invention have significantly longer useful lives and produce more wire free from surface defects traceable to the capstan rings.

The very high shear strength of the material prepared by the method described in Example 2 is believed to be due to the strong forces acting at the grain boundaries, as described above.

Best capstan rings have been found to contain between 2.6% and 3.1% MgO + CaO, and to have a density of 5.75 to 5.80 g/cm³ and an average grain size of 40 to 60 m$\mu$, as compared to grain sizes of less than 10 m$\mu$ in sintered aluminum rings. The zirconium oxide rings are practically free from pores.

Other annular bodies subjected to contact with rapidly moving wire at high contact pressure may be prepared from the material of Example 2 in an obvious manner to form the exposed surfaces of guide pulleys and reversing pulleys.

Plate-shaped zirconium oxide bodies of the invention prepared by the method of Example 1 have been used to advantage as sealing elements between the rotary pistons and trochoidal cylinder walls of Wankel engines. Sealing elements of sintered aluminum oxide were proposed for this purpose in the published German Patent Application No. 1,450,328, but zirconium oxide elements have been found to have a much longer useful life believed due to their superior combination of high flexural strength, impact resistance, and fatigue strength. In a standard engine test, piston sealing elements prepared by the method described in Example 1 and engaging a cylinder surface of nickel carrying embedded silicon carbide grains, suffered a wear loss of only 0.2 m$\mu$ per hour.

For reasons obvious from the preceding description of plate-shaped zirconium oxide bodies prepared by the method of Example 1, tool bits prepared from the same material have been found most advantageous in machine tools, particularly lathes, and often superior to the aluminum oxide bits heretofore unsurpassed in high-speed cutting operations in which the temperature of the tool bit is too high for continuous use of alloy steels.

The best zirconium oxide tool bits are prepared from compacts containing a combined total of approximately 2.9% MgO in the form of magnesium oxide powder and in the form of stabilizing oxide. Enough magnesium oxide is volatilized during sintering to bring the ultimate magnesium oxide content of the finished product to the optimum value of 2.7%.

The zirconium oxide tools or tool bits of the invention are of particular advantage in the machining of aluminum and aluminum alloy because of the reduced tendency of forming an aluminum deposit welded to the tool surface.

Other applications of the shaped bodies of sintered, polycrystalline zirconium oxide according to this invention will readily suggest themselves to those skilled in the art. It should be understood, therefore, that this invention may be practiced otherwise than as specifically disclosed.

What is claimed is:

1. A shaped body essentially consisting of sintered polycrystalline zirconium oxide and 2.5% to 3.5% of at least one oxide of the group consisting of oxides of magnesium, calcium, rare earth metal, cadmium, manganese, cobalt, and titanium, 75% to 95% of said body consisting of cubic crystals, said body having a density greater than 5.5 g/cm³, and the material of said body having a flexural strength of at least 30 kp/mm², all percent values being by weight.

2. A body as set forth in claim 1, said body containing at least 2.7% of at least one member of the group consisting of magnesium oxide and calcium oxide.

3. A body as set forth in claim 1, wherein said oxide in magnesium oxide, the amount of said oxide being 2.5% to 3.0%, said strength being at least 45 kp/mm².

4. A body as set forth in claim 3, wherein said amount is 2.6% to 2.85%, and said strength is greater than 55 kp/mm².

5. A body as set forth in claim 4, wherein said density is greater than 5.6 g/cm³.

6. A body as set forth in claim 1, wherein the oxides of said group are magnesium oxide and calcium oxide in a weight ratio between 1:2 and 2:1, the shear strength of said material being greater than 55 kp/mm$^2$.

7. A body as set forth in claim 6, wherein said crystals have a grain size greater than 35 m$\mu$, said body having a density greater than 5.55 g/cm$^3$.

8. A body as set forth in claim 6, which is annular.

9. A body as set forth in claim 6, which is plate-shaped.

10. A method of preparing a shaped body which comprises:
  a. intimately mixing
    1. 30% to 90% pulverulent, monoclinic zirconium oxide,
    2. 7.8% to 69.5% pulverulent zirconium oxide stabilized by an amount of a stabilizing oxide selected from the group consisting of magnesium oxide and calcium oxide and bound to said stabilized zirconium oxide, and
    3. 0.5% to 2.2% of a pulverulent member selected from the group consisting of magnesium oxide and calcium oxide;
  b. shaping said mixture under applied pressure into a green compact; and
  c. heating said compact at a temperature about 1,600°C until said compact is sintered to a shaped body,
    1. said amount being sufficient to make the combined weight of magnesium oxide and calcium oxide in said body 2.7% to 3.3% of the weight of said body,
    2. all percent values being by weight.

11. A method as set forth in claim 10, wherein said stabilizing oxide is calcium oxide, and said pulverulent member is magnesium oxide.

12. A method as set forth in claim 10, wherein said monoclinic zirconium oxide contains more than 99% ZrO$_2$.

13. A method as set forth in claim 10, wherein said stabilizing oxide and said pulverulent member are magnesium oxide.

* * * * *

UNITED STATES PATENT AND TRADEMARK OFFICE
CERTIFICATE OF CORRECTION

PATENT NO. : 3,887,387
DATED : June 3, 1975
INVENTOR(S) : HANS STURHAHN

It is certified that error appears in the above-identified patent and that said Letters Patent are hereby corrected as shown below:

In the title, line /73/, change "Feldmuhle Anlagen- und
   Produktions- Gesellschaft mit beschrankter Haftung,
   Oberkassel, Germany" to --

Feldmühle Anlagen- und Produktionsgesellschaft
   mit beschränkter Haftung, Duesseldorf-Oberkassel,
   Germany --

Signed and Sealed this

*twenty-third* Day of *September 1975*

[SEAL]

Attest:

RUTH C. MASON
*Attesting Officer*

C. MARSHALL DANN
*Commissioner of Patents and Trademarks*